Nov. 4, 1941.  R. W. GRISWOLD, 2D  2,261,363
SPOILER
Filed April 29, 1939   2 Sheets-Sheet 1
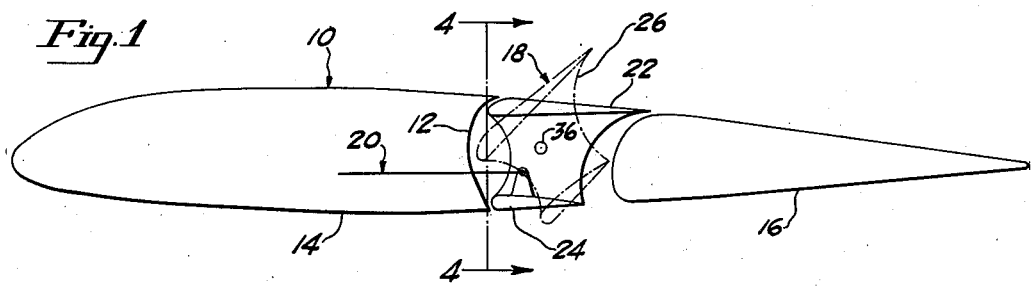
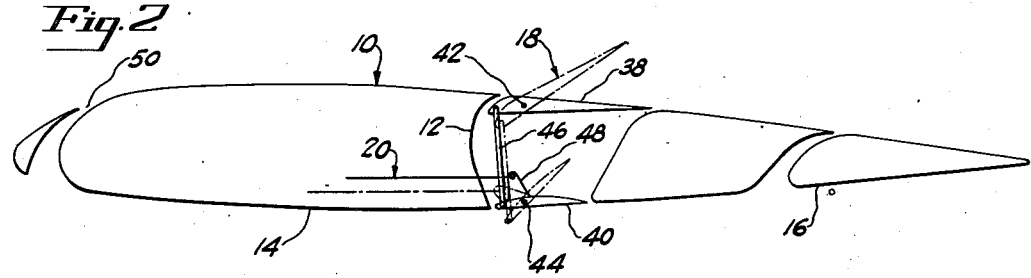
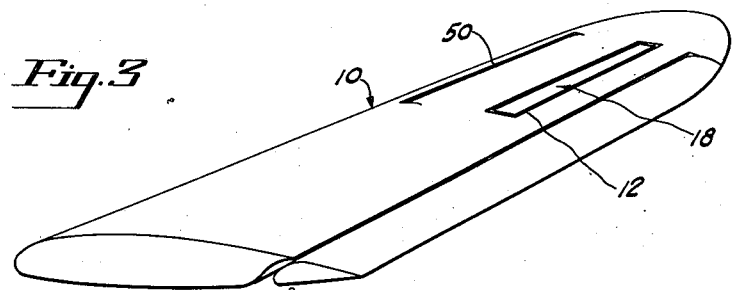
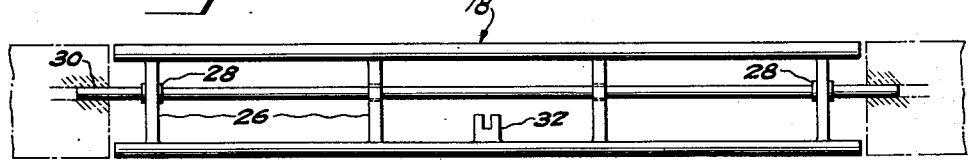
INVENTOR
Roger W. Griswold, II
BY Harris G. Luther
ATTORNEY

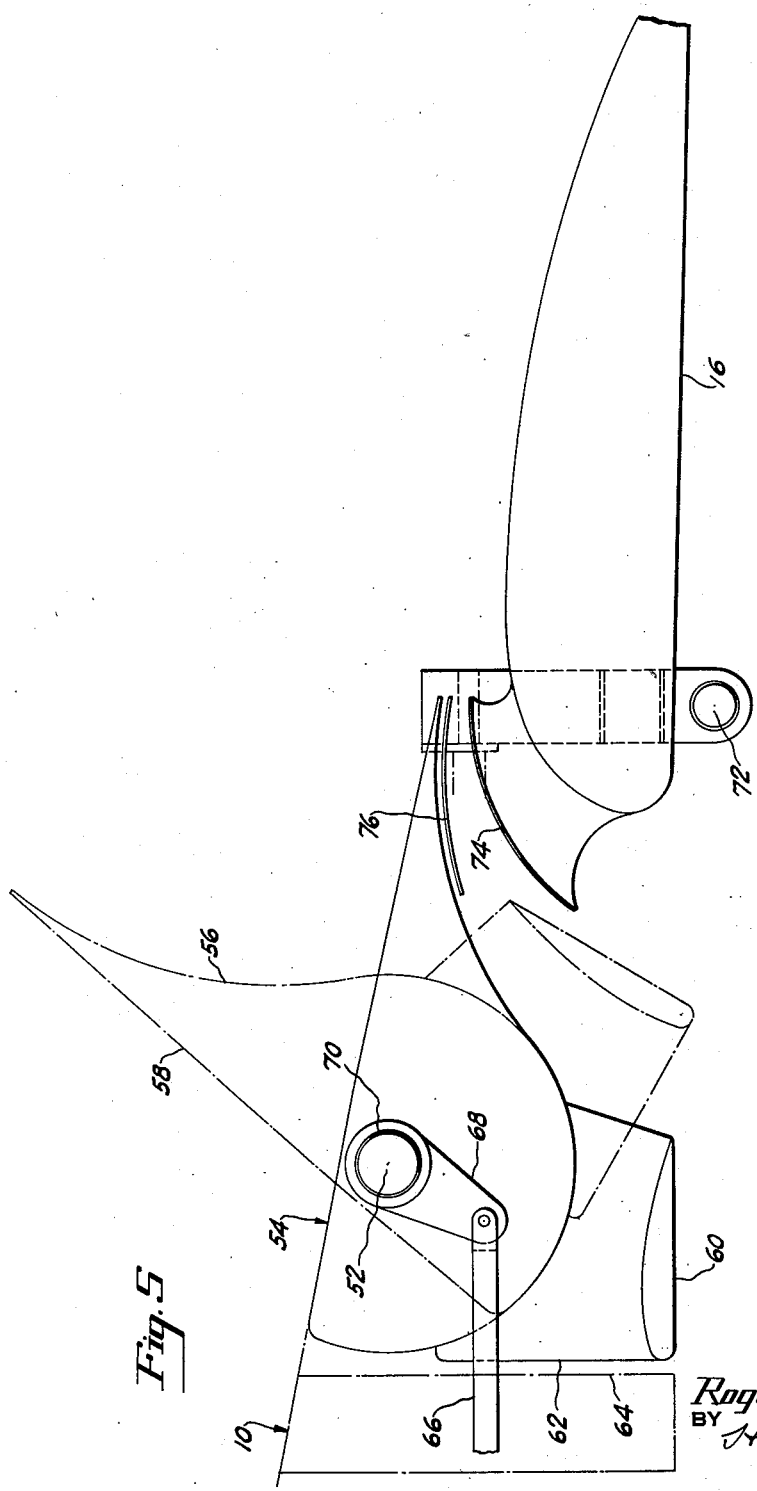

Patented Nov. 4, 1941

2,261,363

UNITED STATES PATENT OFFICE 2,261,363

SPOILER

Roger W. Griswold, II, Old Lyme, Conn., assignor to United Aircraft Corporation, East Hartford, Conn., a corporation of Delaware Application April 29, 1939, Serial No. 270,825

3 Claims. (Cl. 244—90)

This invention relates to improvements in aircraft wing structures and has particular reference to improved control surface portions for such a wing structure.

An object of the invention resides in the provision of improved lateral control means so positioned in the wing structure, as to permit the use of a full span trailing edge flap without interfering with the main wing supporting elements.

A further object resides in the provision of an improved wing lift spoiler for obtaining effective rolling moment control of an aircraft about its longitudinal axis, especially in the range of large lift coefficients as attained with modern high lift devices.

A still further object resides in the provision of an improved wing lift spoiler effective to so control the drag moment of the wings acting about the vertical axis of the aircraft as to give the desirable characteristic of positive yaw combined with rolling control, and it is within the scope of the invention to thus provide properly coordinated lateral and directional control by means of the single control system herewith disclosed.

An additional object of the invention resides in the provision of an improved wing spoiler which is both statically and aerodynamically balanced about its pivot axis thus making it particularly adaptable for high speed aircraft and those of very large size.

Another object resides in the provision of improved lift spoilers including flow deflectors mounted in an airflow passage extending through the wing to increase their effectiveness and to eliminate the lag inherent with certain types of spoilers known to the prior art.

Other objects and advantages will be more particularly pointed out hereinafter or will become apparent as the description proceeds.

In the accompanying drawings, in which like reference numerals are used to designate similar parts throughout, there is illustrated, by way of example, two slightly different forms of wing flaps constructed according to the invention. The drawings, however, are for the purpose of illustration only and are not to be taken as limiting or restricting the scope of the invention.

In the drawings, Fig. 1 is a somewhat schematic transverse sectional view of an airplane wing showing a wing lift spoiler, constructed according to the invention, incorporated therein.

Fig. 2 is a view similar to Fig. 1 showing a somewhat modified form of wing lift spoiler construction.

Fig. 3 is a perspective view of an airplane wing showing the location of a lift spoiler of the form shown in Figs. 1 or 2 as used for lateral and directional control of the airplane.

Fig. 4 is a front elevational view of a wing lift spoiler constructed according to the form shown in Fig. 1, and Fig. 5 is a diagrammatic view of a still further modified form of lift spoiler.

Referring to the drawings in detail, the numeral 10 generally designates an airplane wing which may be provided for a portion of its length with a longitudinally extending aperture or airflow passage 12 extending therethrough and dividing that portion of the wing into a forward portion 14 and a rearward portion 16 disposed on opposite sides of such passage. The portions 14 and 16 may be either fixed or movable but in the usual arrangement the forward portion 14, or at least the major portion thereof, contains the main wing spars and is relatively fixed and the rearward portion 16 or a major part thereof, is in the form of a tiltable flap for changing the lift coefficient of the wing.

The improved spoiler, generally indicated at 18, is pivotally mounted in the wing gap 12, which may have the proportions and functions of a normal wing slot for the neutral spoiler position, and is movable by some suitable linkage or cable device, as generally indicated at 20.

In the form of the invention shown in Figs. 1 and 4, the spoiler comprises an upper deflector 22, the upper surface of which is substantially flush with the upper surface of the wing when the flap is in its operative position as shown in full lines in Fig. 1, and a lower deflector 24, the lower surface of which is flush with the lower surface of the wing. These two deflectors 22 and 24 may be of airfoil section if desired, and are secured together by rigid plates or struts, as indicated at 26, spaced apart along the length of the upper and lower deflectors.

The spoiler, comprising the upper and lower deflectors or plates 22 and 24 and the connecting struts or ribs 26, is pivotally supported on bearings, as indicated at 28, carried by some of the supporting struts 26. These bearings 28 may be supported on some suitable support such as the longitudinally arranged tubular member 30 extending lengthwise of the passage 12 and secured at its ends to the fixed portion of the wing. The spoiler is tiltable about the bearing support 28 by the cable or linkage system 20 which may be operatively secured to the deflector member by suitable means such as the apertured lug 32 secured to the upper surface of the lower plate 24.

The axis 36 of the bearings 28 is so positioned with respect to the area of the transverse section of the spoiler that the spoiler may be moved between its inoperative position, shown in full lines in Fig. 1 and its operative position shown in broken lines, with a minimum of force exerted on the member 20. This axis is also located so that, when in its operative position, the rearward portion of the upper member 22 extends above the upper surface of the wing and the forward portion of the lower member 24 projects below the lower surface of the wing, as shown in broken lines in Fig. 1. With this arrangement the upper member deflects the flow of air away from the upper surface of the wing and decreases the lift coefficient of the wing while the lower member assists in directing a part of the high pressure flow of air from the undersurface of the wing, with consequent further loss of lift, through the passage 12 to the upper surface of the wing to further disturb the airflow over the upper surface, the combined effect causing an increase in drag in spite of the decrease in wing lift coefficient. Since the portions of the upper and lower members which project beyond the wing are disposed on opposite sides of the pivotal support, the air forces acting on the exposed surface of the lower member, when the flap is in operative position tend to balance the air forces acting on the exposed surface of the upper member. By altering the proportions of the upper and lower members as well as the relative position of the axis 36, the resultant operating hinge moments may be controlled within any reasonably desired limits. This construction provides an extremely sensitive and highly efficient lift spoiler for lateral and directional control of the airplane which may be operated with only moderate effort applied to the manual controls, even in the case of very large aircraft.

In the modified form of the invention shown in Fig. 2 the upper member 38 and the lower member 40, are independently secured to the fixed portion of the wing by individual pivots, as indicated at 42 and 44 respectively, and are connected together for simultaneous movements by the link 46 pivotally connected at its ends to the forward edge portions of the upper and lower deflector members. In this construction the deflectors are operated by a suitable link or cable member 20 connected to an apertured lug 48 secured to the upper surface of the lower deflector member 40 and the air forces acting on the forward portion of the lower member when the spoiler is brought into operative position, tends to balance the air forces acting on the rearward portion of the upper member as the same is moved above the upper surface of the wing in the same manner in which the air forces acting on the lower member 24 partially balance the forces acting on the upper member 22 in the form shown in Fig. 1. Also the forward edge of the member 40, projecting below the lower surface of the wing 10, acts as a scoop to increase the flow of air through the passage 12 when the spoiler is in operative position, to assist the upper deflector 38 in decreasing the lift and increasing the drag effect of the wing. It will be readily apparent that this modified form of the invention makes possible variable angular displacements of the lower member relative to that of the upper member, according to the attachment of connecting link 46 to said members, and may provide variable moment arms, for turning the members about their pivotal mountings. This may be desirable for aerodynamic reasons or to obtain the most favorable balance of control forces throughout the operative range. Since relatively large rolling moment coefficients are obtained with the spoilers a comparatively short span section would be disposed in the outer portion of each wing, as illustrated in Fig. 3, and the two spoilers would be operated by a mechanism arranged to move the spoiler on only one wing at a time, a suitable mechanism for this purpose being illustrated and described in application Serial Number 214,486 filed June 18, 1938, by Rex B. Beisel for Improvements in airplane control devices.

Figs. 2 and 3 illustrate how this improved lateral control system permits the installation of a full span trailing edge high lift device, such as the slotted flap shown in this instance. They also suggest a way to still further extend the effectiveness of the improved spoiler control by means of a partial span leading edge slot, as indicated at 50, which may be of the movable type, either automatically or manually controlled, or of the fixed type, as shown. Such a slot would have approximately the same spanwise extent and location as the spoiler (as shown in Fig. 3) and would be effective to control the flow and thus delay the stall over this section of the wing to a substantially increased angle of attack. Spoiling of the flow with consequent effective rolling and yawing moments produced by the spoiler, well beyond the stall of the main portion of the wing itself, is thus obtained.

In the modified form of lift spoiler particularly illustrated in Fig. 5, the spoiler pivot 52 is located near the upper surface of the spoiler and is spaced rearwardly from the leading edge of the upper portion of the spoiler. The upper member of the spoiler, as indicated generally at 54, has an upper surface which lies in the contour of the wing surface at that location when the spoiler is in its neutral position, as shown in full lines in Fig. 5, and has an undersurface the forward portion of which has a substantially semi-cylindrical form having its axis coincident with the center of the pivot 52 and having its rearward portion faired through an inverse curve 56 to the trailing edge of the upper surface 58. The lower spoiler member, in the form of a relatively narrow strip 60 which may be of airfoil section, is secured to the upper member by spaced thin supports 62 and is so located with respect to the upper member that, when the spoiler is in its neutral position, the forward edge of the member 60 is substantially in contact with the forward wall 64 of the spoiler space and the undersurface of this member constitutes a continuation of the undersurface of the wing across a portion of the space provided between the fixed wing portion 10 and the flap 16. The spoiler may be rotated about its pivot 52 by suitable means such as the link 66 pivotally connected to an arm 68 projecting radially from the spoiler supporting shaft 70.

The portion of the wing to the rear of the spoiler 54 may be in the form of a pivoted lift increasing flap, tiltable about an axis 72 to change the lift of the wing. If desired, this flap may be provided along its upper forward portion with a deflector plate 74 secured to the flap but spaced therefrom to provide an energy converting airflow slot between the undersurface of the plate and the adjacent surface of the flap to receive relatively high pressure air from below the wing and direct said air at an increased velocity over the upper surface of the flap in all positions of flap inclination to increase the aerodynamic efficiency of the flap and prevent it from stalling at high angles of incidence, all as particularly set forth in Patent Number 2,117,607 issued May 17, 1938, to Roger W. Griswold, II, for Slotted deflector flap.

If desired the efficiency of the deflector plate 74 may be somewhat increased by placing a fixed curved shield 76 in position over the plate to provide a rearwardly tapering air slot between the shield and the plate to energize the upper surface of the plate and assist in directing air over the plate and into the space between the deflector plate and the flap 16. In the arrangement shown the shield 76 is entirely covered by the rearward portion of the upper spoiler member when the spoiler is in neutral position, and the reverse curve 56 of the upper spoiler portion has substantially the same contour as the upper surface of the shield so that the spoiler portion closely overlies the shield and constitutes a continuation of the air slot leading from the undersurface of the wing to the trailing edges of the shield 76 and deflector plate 74. Thus, when the spoiler is in its neutral position, as shown in full lines in Fig. 5, it assists in providing an aerodynamically efficient wing slot from the undersurface of the wing to the exit gap between the trailing edge of the spoiler and the adjacent upper surface of the flap 16 to improve the lift increasing effect of the flap when tilted downwardly about the axis 72.

When the spoiler is moved to its operative lift spoiling position, as shown in broken lines in Fig. 5, the portion of the upper member to the rear of the pivot 52 projects above the upper wing surface to disrupt the flow of air over the upper surface of the wing. At the same time the leading edge of this upper member moves away from the rear wall 64 of the fixed wing portion and the rearward portion of the upper member moves away from the leading edge of the shield 76 thus providing an air flow gap at each side of the upper spoiler member. Simultaneously the lower spoiler member 60 moves to a position in which its rearward portion enters and partially blocks the slot between the deflector plate 74 and shield 76 and its leading edge projects somewhat below the upper surface of the wing to the rear of the upper member 54 to constitute an air scoop for forcing air flowing along the undersurface of the wing into the space immediately below the upper spoiler member and through the gaps between the upper spoiler member and the wall 64 and leading edge of the shield 76, to the upper surface of the wing. The air forced past the upper spoiler member from the undersurface of the wing and discharged into the airflow over the upper wing surface in the immediate vicinity of the projecting upper spoiler member adds materially to the effect of the spoiler in disrupting the airflow over the upper wing surface and causing the wing to lose a substantial portion of its lift effect.

Thus, there is provided in the form of spoiler shown in Fig. 5 an arrangement which materially assists in increasing the wing lift coefficient when the spoiler is in its neutral or inoperative position and which at the same time constitutes a highly efficient lift spoiler when moved to its operative lift spoiling position.

While three slightly different mechanical arrangements have been hereinabove described and illustrated in the accompanying drawings for the purpose of disclosing the invention, it is to be understood that the invention is not limited to the particular constructions so illustrated and described, but that such changes in the size, shape and arrangement of the various parts may be resorted to as come within the scope of the subjoined claims.

For instance the spoiler of Fig. 1 may be substituted for the spoiler of Fig. 2 in Fig. 2 or vice-versa and the flap of Fig. 2 may be substituted for the fixed section of Fig. 1 or vice-versa.

Having now described the invention so that others skilled in the art may clearly understand the same, what it is desired to secure by Letters Patent is as follows:

1. In a wing, a lift increasing flap having a front portion forming the rear boundary of a reenergizing wing slot, a lift spoiler located in an opening in said wing and having a rear portion forming at least a portion of the front boundary of said slot, a balancing vane disposed adjacent to the lower surface of said wing and connected with said spoiler and means for moving said spoiler to project the same above the wing upper surface and change said reenergizing slot to a diverging wing gap by removing at least a portion of the front boundary of said slot, said spoiler balancing vane being simultaneously moved to a position adjacent the front portion of said flap to disrupt the smooth flow of air over said flap.

2. An airplane lift spoiler adapted to be disposed in an airflow passage extending through an airplane wing comprising, a movable upper deflector member having a tapered rearward portion cooperating with a part of said wing to form a convergent wing slot exit to said passage when said deflector is in its retracted position and movable to project above the upper surface of said wing and form a divergent wing gap exit to said passage, and a lower deflector member movable with said upper member to form a normal-to-the-lower-surface slot entrance to said passage when in its retracted position and to project below the lower surface of said wing and form an air scoop entrance to said passage when in its extended position, and means for simultaneously moving said deflectors.

3. In combination with an airplane wing, a wing lift spoiler disposed in an airflow passage extending through said wing comprising, an upper deflector member which cooperates with the adjacent sides of said passage when in its retracted position to form an air accelerating discharge slot for directing an energized air jet over the rearward portion of said wing and which projects above the upper surface of the wing when in an extended position to form with the sides of said passage an airflow decelerating wing gap for directing an air stream away from the upper surface of said wing, a lower deflector member which cooperates with the adjacent sides of said passage when in its retracted position to provide an air entrance opening to said passage normal to the airflow along the lower wing surface and which in its extended position projects below the lower surface of said wing to form with an adjacent side of said passage an air entrance opening for said wing passage directed into the airflow along the lower wing surface at an acute angle relative to the direction of said airflow, means connecting said upper and lower deflector members for simultaneous movement and for transferring air pressure loads from one of said deflector members to the other, and manually controllable means for moving said members.

ROGER W. GRISWOLD, II.